Figure 1:
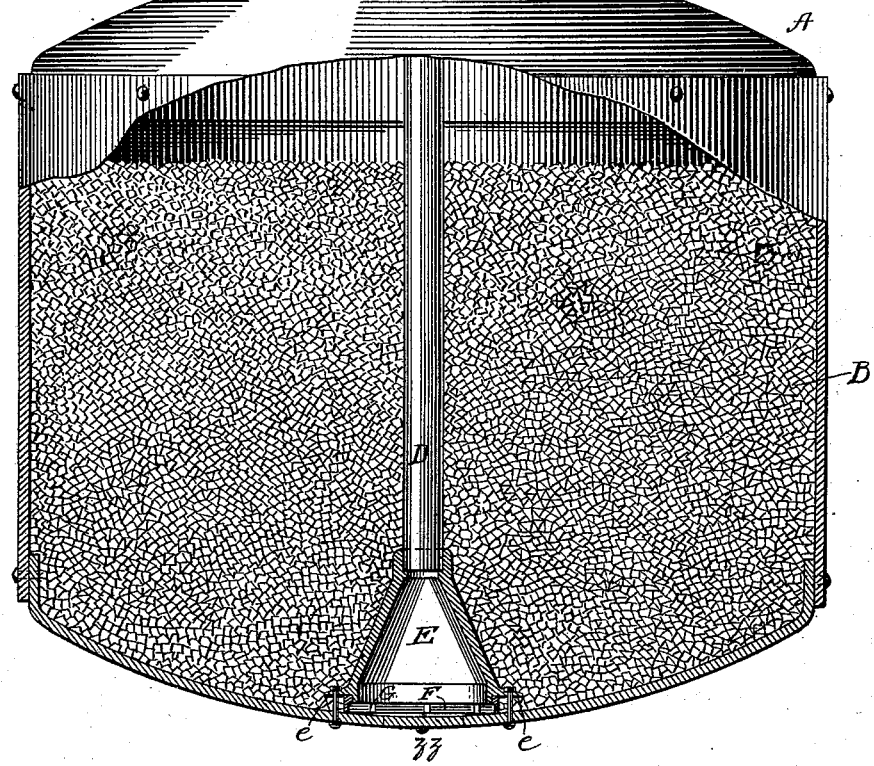

(No Model.)  3 Sheets—Sheet 1.

D. C. & J. E. WILLIAMSON.
FILTER.

No. 524,155.  Patented Aug. 7, 1894.

WITNESSES:
Frank S. Ober
H. A. Acken

INVENTORS
David C. Williamson
James E. Williamson
BY
G. H. Stockbridge
Their ATTORNEY (No Model.) 3 Sheets—Sheet 2.
D. C. & J. E. WILLIAMSON.
FILTER.
No. 524,155. Patented Aug. 7, 1894.
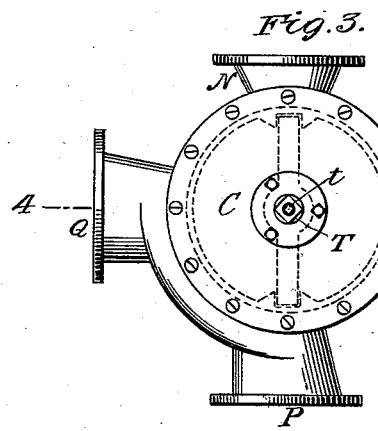
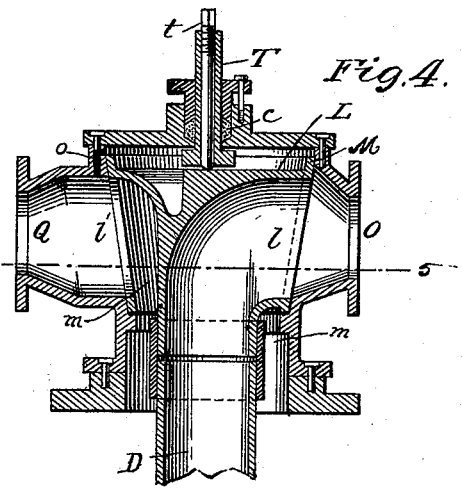
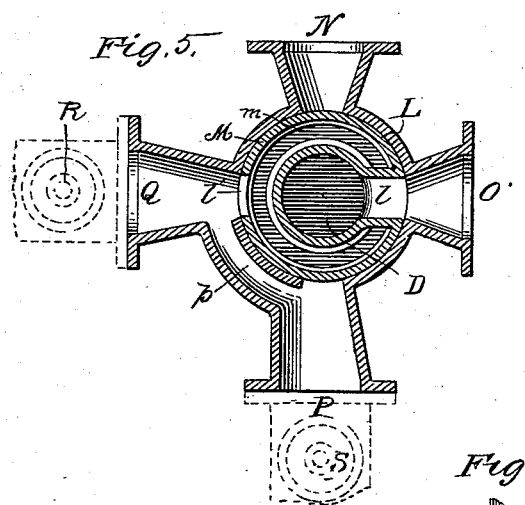
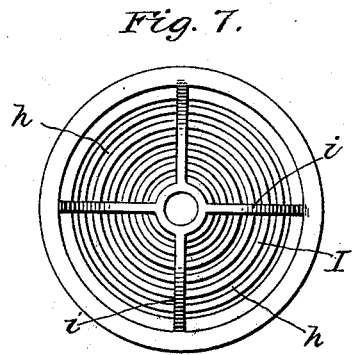
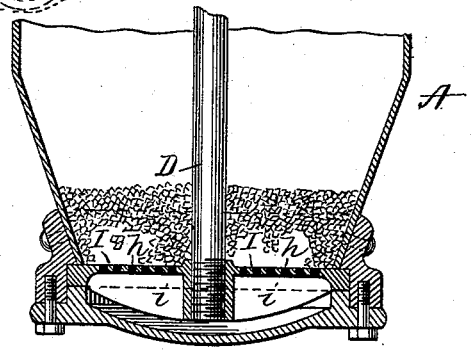
WITNESSES:
Frank S. Ober
H. A. Acken
INVENTORS:
David C. Williamson,
James E. Williamson,
BY
G. H. Stockbridge
Their ATTORNEY (No Model.) 3 Sheets—Sheet 3.
D. C. & J. E. WILLIAMSON.
FILTER.
No. 524,155. Patented Aug. 7, 1894.
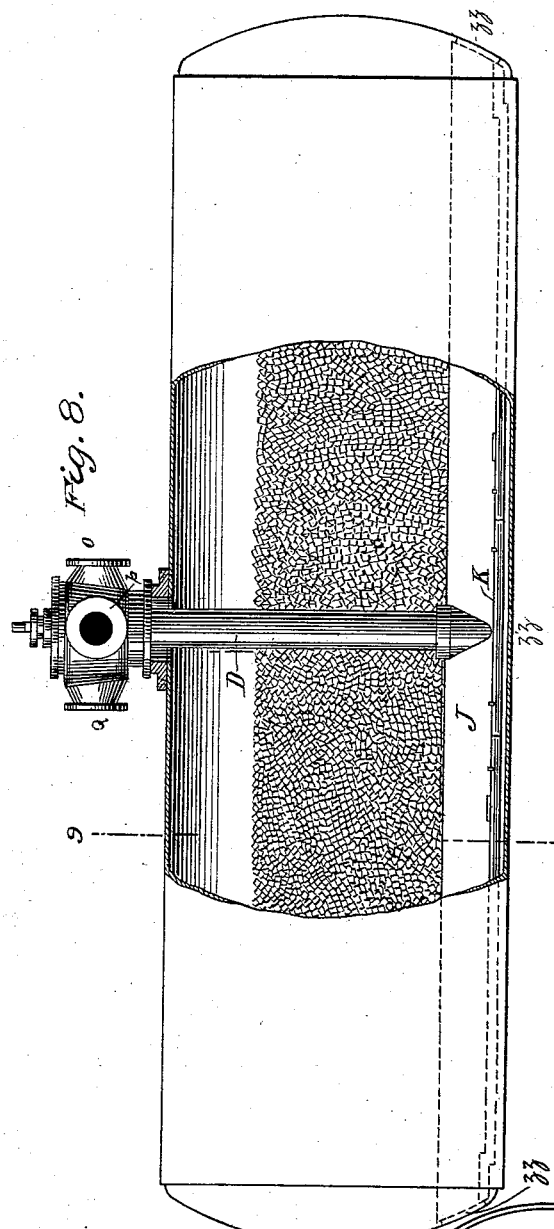
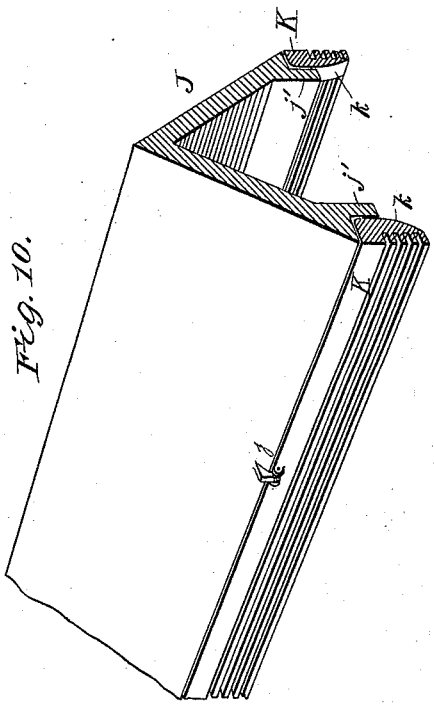
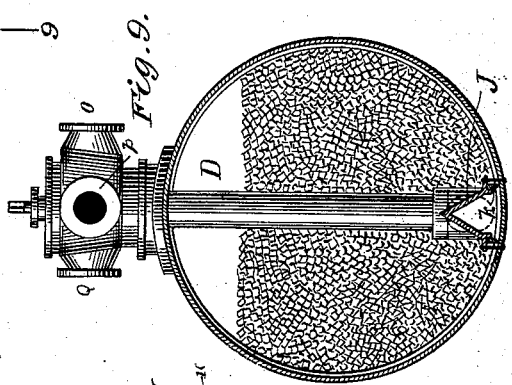
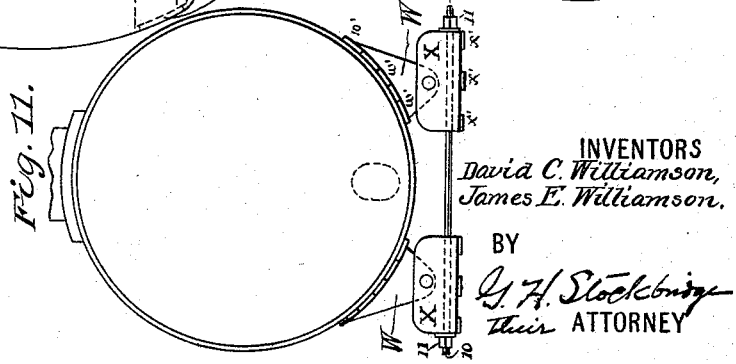
WITNESSES:
INVENTORS
David C. Williamson,
James E. Williamson.
BY
*G. H. Stockbridge*
Their ATTORNEY

UNITED STATES PATENT OFFICE.

DAVID C. WILLIAMSON AND JAMES E. WILLIAMSON, OF STAMFORD, CONNECTICUT.

FILTER.

SPECIFICATION forming part of Letters Patent No. 524,155, dated August 7, 1894.

Application filed February 15, 1893. Serial No. 462,421. (No model.)

*To all whom it may concern:*

Be it known that we, DAVID C. WILLIAMSON and JAMES E. WILLIAMSON, citizens of the United States, residing at Stamford, in the State of Connecticut, have invented certain new and useful Improvements in Filters; and we do hereby declare the following to be a full, clear, and exact description of the invention, such as will enable others skilled in the art to which it appertains to make and use the same.

Our invention relates to improvements in filters for water and other liquids, and it consists generally in concentrating the apparatus into its most compact form, and also in concentrating the action of the water used in cleansing the sand, or other filtering medium, which has become choked in the process of filtering, in such a manner as to serve most effectually for causing the mass to be stirred, ground, and thereby cleansed.

In the filtering apparatus now in use, there is a multiplicity of cocks and valves which it is one of the objects of the present invention to dispense with. The usual cocks and valves are distributed in a series of pipes and are entirely independent of each other in their action. We provide a four-way cock to which the conducting pipes are led, and by the manipulation of a central rotatable valve we accomplish all the connections necessary for performing the operations of a filter. Moreover, in applying the cleansing water for moving the particles of sand, charcoal, or other filtering matter, we concentrate its action upon a certain portion of the sand or other matter, instead of attempting to lift the whole mass at once. We have found in practice that such a lifting of the mass of filtering material is not necessarily followed by a grinding of the particles together, or loosening the dirt which adheres to the said particles. By concentrating the action in the manner which we have described and illustrated, we insure the final stirring of all the particles by a positive action of the cleansing water. In some forms of apparatus we prefer to throw the particles strongly outward by means of the cleansing current, whereupon their places are taken by other particles which are in turn thrown outward and upward. In this way, all the particles are finally acted upon by a direct and positive action. In other forms of apparatus, we prefer to throw the particles of filtering material which are in the neighborhood of the delivery pipe for the cleansing water directly upward, though we do not attempt to lift the whole mass of filtering material in this way. In the latter forms of apparatus, the sand which is thrown upward (or the other filtering material, as the case may be) naturally falls to the outside, after being thrown up in the center, and in this way comes down to be acted on again if the process is continued long enough; while in the former types of apparatus the reverse process takes place, that is to say, the particles of filtering material are carried up on the outside and fall back toward the pipe which conveys the cleansing water.

We have illustrated our invention in the accompanying drawings, in which—

Figure 2:
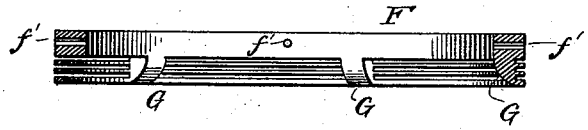

Figure 1 is an elevation, partly in section, of a filter packed with loose sand or charcoal to serve as a filtering medium. Fig. 2 is an enlarged detail view of a portion of the apparatus shown in Fig. 1. Fig. 3 is a plan of our four-way cock. Fig. 4 is a vertical section through the same, along the line 4—4 in Fig. 3. Fig. 5 is a horizontal section of the same, along the line 5—5 in Fig. 4. Fig. 6 is a vertical section of a modified form of filter, a part of the filter being broken away. Fig. 7 is a detail bottom view of the form of filter shown in Fig. 6. Fig. 8 is an elevation, partly sectional, of a very large filter supplied with our improvements. Fig. 9 is a section of the same, along the line of 9—9 in Fig. 8, and Figs. 10 and 11 are detail views.

Referring to the drawings by letters and figures, A, is a filter partly filled with sand, or other filtering medium, B. The water to be filtered is admitted to the filter by way of the four-way cock, C, the action of which will be described presently. The cleansing water is admitted through a pipe, D, which is also connected with the four-way cock, C, and which has attached to its lower end a hollow cone, E. The cone, E, is provided with lugs, e, e, through which it is bolted to the base of the filter, as shown. Between the lower end of the cone, E, and the base of the filter is a ring, F, which fits around a circular rim or flange, f, on the said cone. The ring, F, is secured to the said rim, f, by being screwed or bolted thereto, the openings for the said screws or bolts being shown at f', f', in Fig. 2. The ring, F, is provided with horizontal slits which cut through the whole ring, except where certain ribs, G, G, are left for holding the entire structure together.

From the foregoing it will be seen that there is at the bottom of the cone, E, that is to say, at the bottom of the passage to which the pipe D, for the cleansing water leads, a number of circular openings through which the water can pass out, the said openings being continuous, except where the ribs, G, come in. Assuming, now, that the four-way cock is turned so as to admit cleansing water to the pipe D, under pressure, it will be forced out through the openings in the ring, F, and will set the sand, or other filtering material, into active motion on all sides of the ring, F. Owing to the curve in the bottom of the filter, the motion of the particles directly affected by the cleansing water will be outward and partly upward. The consequence will be that the particles at the bottom of the filter will be radially discharged and will give place to other particles above them, which will in their turn be sent on the same journey. After coursing up the inner side of the vertical walls of the filter, the agitated particles will be thrown toward the center by the guide, H, and will settle down near the pipe, D, and finally reach the bottom again, ready to be acted upon as before.

It is evident that the action described will cause the particles of filtering material to grind upon each other and will loosen the dirt with which the filtering matter has become clogged and cleanse the whole mass. After the process has been carried on long enough, the waters of cleansing are led off in a manner which will be described hereinafter.

In Figs. 6 and 7, we illustrate a process which is essentially the reverse of the foregoing. The cleansing water is delivered from the pipe, D, into the narrowed bottom of the filter, A, and is forced up from the inclosure at the said narrowed end of the filter through a series of circular perforations, h, h, in a horizontal grid, I, which fills the most of the opening above the narrowed end of the filter. In Fig. 7 are shown ribs, i, i, which hold together the rings forming the grid, I.

It will be observed that the filter, A, shown in Fig. 6, is larger at the top, its lower end being considerably narrower, and the grid forming a floor for a comparatively small portion of the sand, or other filtering material. Now, the water which is forced up through the grid is able to lift forcibly the inner portion of the filtering material and carry it up to the top where it is thrown over upon the outer ring of filtering matter, bearing the said outer portion downward to take the place of that which has been lifted.

To adapt our invention to the purposes of a very large filter, such as is often called for in practice, we provide such a filter with a shed, J, as shown in Figs. 9 and 10, and let this shed run along the bottom of the filter throughout its entire length. Under the walls of the shed, we place, on each side, bars, K, K, which are slitted through their whole length, except at certain points where ribs, k, k, hold the structure together. These bars, K, K, are joined to the shed, J, by hinges, j, j, the object being to permit the bars to yield under excessive pressure, as will be explained farther on. The bars may be bolted, if preferred, to flanges, j', j', on the shed, J.

The pipe, D, leads into the shed, J, at its middle portion, and its lower end empties into the said shed, as clearly illustrated in the drawings. The filter, in this instance, being cylindrical in form, it is clear that the action set up when water is forced into the shed and out through the slits, will be to cause a tendency toward circular motion in the particles of filtering material. The said particles will be carried up on the inner walls of the filter and thrown toward the center by the natural curve of the cylinder.

It is well known in the art of filtering that the cleansing water, after the process of cleansing is completed, is generally cut off and the water to be filtered is passed into the filtering apparatus. It is also well known that the water which is to be filtered is, in such cases, usually allowed to run off into the sewer or elsewhere for a few minutes before it is carried to the receptacle for filtered water. The object of this last named process is to carry off the dirt which may be suspended in the filtering mass before the water is passed to the filtered water receptacle. We also employ this process in addition to the processes already described, and we accomplish it and the other operations of the apparatus mainly through the medium of the stop cock, or, rather, the four-way cock, C.

Inside the walls of the stop cock, C, is a rotatable plug, L, having a port at l, leading to the pipe, D. Between the walls of the port, l, and an outer wall, M, of the plug, is a port, m, which is annular in general shape, except where it is interrupted by the walls of the port l. In this outer wall, M, is a port, l', leading to the annular port, m. Now, it will be seen that there are four inlets or exits, N, O, P, Q, leading to the plug, L, or from the said plug. The part P, is the inlet for the water to be filtered and the part N, on the opposite side, is the exit for the water after the filtering process has been completed. Similarly, the part Q, is the inlet for the cleansing or washout water and the part O, is the exit or outlet for the said water.

In the normal operation of the apparatus as a filter the plug is turned so that the port, l', is opposite the inlet, P, and the port, l, opposite the outlet, N. In this position of the parts the water passes in through the port, l', into the port, m, and thence downward into the filter and through the sand, or filtering material, therein. It passes into the pipe, D, through the apertures at the bottom of the cone, E, and being forced up through the said pipe D, goes out at the exit end and thence to the receptacle for filtered water.

It will be noticed that there is a channel, p, connecting the inlets, P, and Q, and that there is a valve, R, in the pipe which leads to the inlet, Q. Now, in case it is desired to wash out the filter with the water which is ordinarily filtered by the apparatus, that is, with water coming in at the inlet, P, the valve, R, will be closed and the rotatable plug, L, will be turned into a position where the port, l, is opposite the inlet, Q, and the port, l', opposite the outlet, O. Thus, the water coming at the inlet, P, will pass down through the pipe, D, and will act in the manner already described for cleansing the filter. Being under pressure, it will be forced up through the ports, m, and l', and pass out through the outlet, O.

It is sometimes desirable to cleanse the filter with water that has already been filtered, in which case the valve S, in the pipe leading to the inlet, P, is closed and the parts are left in the position described in the foregoing paragraph, except that the valve, R, is open. The cleansing water now comes in through the inlet, Q, and goes over the same course as that described above.

The position of the plug, L, shown in Fig. 5, is intended to illustrate the arrangement of the parts after the cleansing process has taken place and the process of filtering has just been renewed. It is not desirable that the first water put into the filter after the cleansing process should pass to the receptacle for filtered water, as it would be likely to carry with it some impurities in the way of dirt suspended in the filtering mass. We provide that this first water should be carried off through the outlet, O, and it is evident that when the parts are placed as indicated in Fig. 5, it will so pass off. That is to say, it will pass down through the ports, l', and m, into the filter and carry back the impurities into the pipe, D, and out through the exit, O.

It is thus apparent that all the operations of a filtering apparatus can be controlled by a valve such as we have invented, and it is also evident that we have succeeded in concentrating not only the structure of the apparatus, but also the action of the forces employed in cleansing the filter.

It will be observed that the outer shell of the cock, C, is provided with a cap having a central stuffing box, c, through which an internally screw-threaded key, T, passes. Within the key is a screw, t, which can be turned down upon a straight surface of the plug, L, to hold it to its seat. Both the key, T, and the screw, t, have squared ends, by means of which they can be operated with the proper tools.

Referring to Fig. 11, it will be seen that the brackets, W, W, are pivoted to feet, X, X, which have a tolerably wide bearing surface at the bottom. The details of Fig. 11 show that the feet, X, X, are each provided with three toes, $x'$, $x'$, $x'$, by means of which contact is made with surfaces more or less uneven. The brackets, W, W, are also each provided with three toes, w, w, w, forming an easy bearing upon the sides of the filter. It will be seen that a rod, 10, screw-threaded at both ends, runs through the feet, X, X, and is provided with nuts, 11, for adjusting the relative distances apart of the two feet. The height of the filter can thus be adjusted by moving the feet nearer to or farther from each other. Evidently, then, the structure consisting of the two feet, X, X, and the two brackets, W, W, may be regarded as a single piece of apparatus, constituting a support for the filter or a portion thereof.

The object of the hinge, j, which has already been referred to, is to permit the bar, K, to yield under excessive pressure from the cleansing water and permit the larger impurities to be carried off under special conditions.

At Z, Z, are shown hand-holes which permit the scrubbing of the parts liable to become clogged inside the filter, and especially the inside of pipe, D, and the perforated apparatus connected therewith. This is an important addition to the filtering apparatus, inasmuch as the liability to clogging is always present. Without the hand-holes it is necessary to remove the whole mass of filtering material at the cost of time, trouble and expense.

We have described the cone, E, and the bars, K, K, as being slitted horizontally, for reasons already explained. It is manifest that it would be within the scope of our invention to perforate the mentioned parts in any other preferred way, provided only that the feature of concentrating the action of the cleansing water be present. In other words, the principle of our invention will be embodied in any apparatus where a continued, constant current of the cleansing liquid produces by successive action a constant scouring of the particles of filtering material.

The beds or bottoms of the filter, as illustrated in the drawings, are inclined in every instance; but this is not essential to the operation of the apparatus, very good results being secured with flat beds or bottoms.

In order to allow of the turning of the plug, L, in setting the four-way cock to its different positions, we connect the said plug with a pipe, D, by means of a sleeve, $o'$. To facilitate the same end, it may be found desirable to let the pipe, D, simply set into the top of the cone, E, instead of securing the two last mentioned parts together.

It remains to call attention to the perforation, o, in the top of the plug, L, the said perforation being shown in Fig. 4. Its object is to permit water to flow in above the top of the plug, L, between the said top and the lower side of the cap, C, whereby the plug will be, to a great extent, balanced, as between an upward and a downward pressure, and excessive pressure upon the screw, $t$, and intermediately upon the cap, C, will be relieved.

Having now described our invention, we claim—

1. In a filtering apparatus, a filter containing sand, charcoal or other filtering material, a pipe leading into said filtering material and ending inside in a slitted portion which is movable, whereby, ordinarily, the water of cleansing passes out through the slits, and whereby, under extreme pressure the movable portion is caused to move and permit the passage of a larger flow of water.

2. In a filtering apparatus, a filter containing sand, charcoal, or other filtering material, a pipe leading into the said filtering material and ending in an enlarged portion at the bottom, the said enlarged portion having a series of slits for allowing the water to pass out, the slits being cut in a hinged portion of the enlarged end, whereby ordinarily, the water of cleansing passes out through the slits, and whereby, under extreme pressure, the hinged portion is lifted and permits the passage of a larger flow of water, as and for the purpose set forth.

3. In a filtering apparatus, a four-way cock having an outer shell and an inner rotatable plug, the said outer shell having four openings, two of which, adjacent to each other, are connected by a channel, and the said inner rotatable plug having one port leading to an inner pipe and an opposite port leading to an outer annular opening, as and for the purpose set forth.

In testimony whereof we have signed our names, in the presence of two witnesses, this 6th day of February, A. D. 1893.

DAVID C. WILLIAMSON.
JAMES E. WILLIAMSON.

Witnesses:
G. H. STOCKBRIDGE,
HARRIETTE BILLINGS.